W. W. JONES.
ARMOR FOR TIRES.
APPLICATION FILED JULY 18, 1908.
955,169.
Patented Apr. 19, 1910.
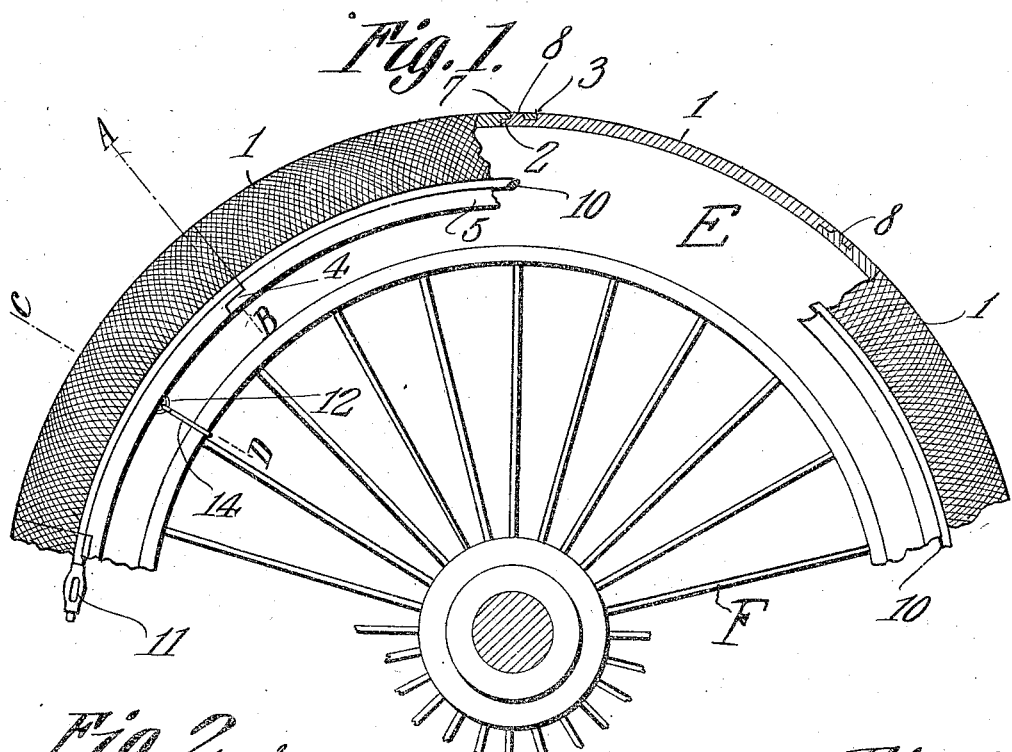
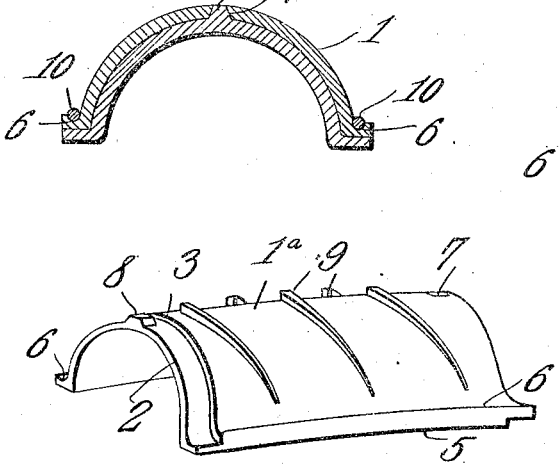
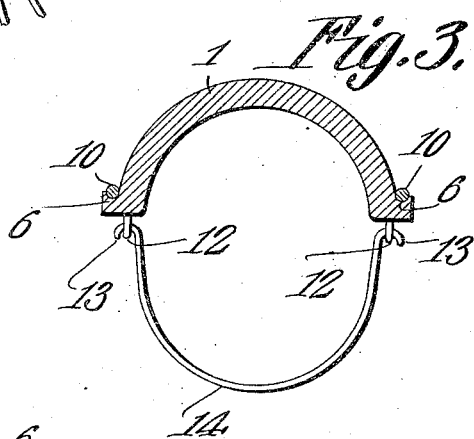
Witnesses
Inventor
Wiley W. Jones.
By
Attorneys

UNITED STATES PATENT OFFICE.

WILEY W. JONES, OF DOWNS, KANSAS.

ARMOR FOR TIRES.

955,169.  Specification of Letters Patent.  Patented Apr. 19, 1910.

Application filed July 18, 1908. Serial No. 444,208.

*To all whom it may concern:*

Be it known that I, WILEY W. JONES, a citizen of the United States, residing at Downs, in the county of Osborne and State of Kansas, have invented a new and useful Armor for Tires, of which the following is a specification.

This invention relates to armor or shields for pneumatic tires, such, for example, as used upon motor vehicles.

The object of the invention is to provide metallic armor made up of separate sections movably connected in a novel manner so as not to interfere with the resiliency of the tire but at the same time prevent the tire from being punctured.

Another object is to provide simple and efficient means for binding the armor sections upon a tire, additional means being utilized to prevent creeping of the armor relative to the tire.

With these and other objects in view the invention consists of certain novel features of construction and combinations of parts which will be hereinafter more fully described and pointed out in the claim.

In the accompanying drawings is shown the preferred form of the invention.

In said drawings: Figure 1 is a side elevation of a portion of a wheel and showing the armor thereon partly in section. Fig. 2 is a section of the armor on line A—B, Fig. 1. Fig. 3 is a section of the armor on line C—D, Fig. 1. Fig. 4 is a perspective view of a modified form of armor section, and showing anti-slipping means thereon.

Referring to the figures by characters of reference, 1 designates an arcuate armor section preferably formed of metal bowed transversely so as to fit snugly upon the tire E of a wheel F. One end of the section 1 has its outer face cut away transversely to form a bowed ledge 2 and a shoulder 3. The other end of the section has its inner face cut away to form a transverse groove or depression 4 the area of which is equal to the area of the ledge 2. A rib 5 is formed along each edge of the section 1 and has its upper face grooved longitudinally as shown at 6. An aperture 7 is formed in one end portion of the section and opens into the groove 4 while a corresponding lug 8 is formed upon the middle portion of the ledge 2. The outer face of the section is suitably roughened as indicated in Fig. 1 or, if desired, as shown in Fig. 4, diagonally disposed ribs 9 may be formed on the section 1ᵃ for the purpose of preventing slipping or skidding.

Tire armor may be formed of any desired number of sections such as herein described and when the sections are assembled the ledge 2 of each section projects into the groove 4 of the next section with stud 8 seated in aperture 7. Circular tie rods 10 are arranged upon the ribs 5 and within the grooves 6 and are tightened by means of turn buckles 11 or in any other suitable manner so as to securely bind the sections 1 upon the tire A. In order that the armor may be prevented from creeping upon the tire eyes 12 are preferably formed upon the sides of one or more of the sections, said eyes being engaged by the hooked ends 13 of a yoke 14 which extends through the wheel and is held against movement by the wheel spokes. As the sections lap at their joints it will obviously be impossible for anything to pass through the joints and puncture the tire.

The armor can be conveniently carried in a compact space and quickly applied to the wheel whenever necessary.

By referring especially to Figs. 1 and 2 it will be noted that the studs 8 extend outwardly from the sections and the terminals thereof are flush with the outer faces of the sections when the parts are assembled. There is therefore no danger of the parts wearing to such an extent as to cause the studs to force into the tire under the armor as would be the case should the studs extend inwardly instead of outwardly.

What is claimed is:

A tire shield comprising arcuate transversely bowed sections each having a transversely extending ledge at one end and a transversely extending groove in its other end, the ledge of one section being disposed to be seated in the groove in the adjoining section, the outer and inner surfaces of the lapping portions of the sections being disposed in the arcs of the outer and inner surfaces of the sections, and a projection extending radially from the convex face of each ledge, the grooved portion of each section having an opening to receive one of said projections, the free end of the projection constituting a portion of the tread of the shield, marginal ribs upon each section, and adjustable circular means carried by and engaging the ribs for binding the sections together and upon a tire.

In testimony that I claim the foregoing as my own, I have hereto affixed my signature in the presence of two witnesses.

WILEY W. JONES.

Witnesses:
J. H. RATHBUN,
ALICE TANNER.